United States Patent [19]

Culbertson et al.

[11] Patent Number: 4,839,446

[45] Date of Patent: Jun. 13, 1989

[54] THERMOSETTING BIS OXAZOLINE-POLYPHENOL BASED RESINS FOR RESIN TRANSFER MOLDING WHICH CONTAIN A MONOOXAZINE OR MONOOXAZOLINE DILUENT

[75] Inventors: Billy M. Culbertson, Worthington; Omar Tiba, Dublin, both of Ohio

[73] Assignee: Ashland Oil, Inc., Ashland, Ky.

[21] Appl. No.: 229,289

[22] Filed: Aug. 8, 1988

[51] Int. Cl.[4] .................. C08G 65/40; C08G 69/44; C08G 69/40

[52] U.S. Cl. .................... 525/504; 525/298; 525/328.8; 525/375; 525/480; 528/137; 528/138; 528/140; 528/141; 528/147; 528/148; 528/149; 528/150; 528/153; 528/154; 528/155; 528/158; 528/162; 528/163; 528/172; 528/208; 528/210; 528/211; 528/212; 528/219

[58] Field of Search .............. 525/504, 298, 328.8, 525/375, 480; 528/137, 138, 140, 141, 147, 148, 149, 150, 153, 154, 155, 158, 162, 163, 172, 208, 210, 211, 212, 219

[56] References Cited

U.S. PATENT DOCUMENTS

| | | | |
|---|---|---|---|
| 4,430,491 | 2/1984 | Culbertson et al. | 528/153 |
| 4,613,662 | 9/1986 | Goel | 528/147 |
| 4,699,970 | 10/1987 | Tiba et al. | 528/141 |
| 4,748,230 | 5/1988 | Tiba et al. | 525/504 |
| 4,775,737 | 10/1988 | Goel | 525/504 |

*Primary Examiner*—John Kight
*Assistant Examiner*—Frederick Krass
*Attorney, Agent, or Firm*—John F. Jones

[57] ABSTRACT

A polymerizable thermosetting composition which is a flowable liquid at moderate temperatures which comprises a mixture of:

(A) from about 75% to about 95% by weight of a mixture of:
  (1) from about 80% to about 20% by weight of a bisoxazoline and
  (2) from about 20% to about 80% by weight of a polyphenolic compound and
(B) from about 5% to about 25% by weight of at least one member selected from the group consisting of a monooxazoline and a monooxazine, a method for forming thermoset products therefrom and the novel thermoset products resulting from said method are described.

10 Claims, No Drawings

THERMOSETTING BIS OXAZOLINE-POLYPHENOL BASED RESINS FOR RESIN TRANSFER MOLDING WHICH CONTAIN A MONOOXAZINE OR MONOOXAZOLINE DILUENT

This invention relates to liquid thermosetting resin mixtures which have viscosities which enable them to be used in resin transfer molding processes and more particularly pertains to liquid thermosetting resin mixtures comprising at least one bisoxazoline, at least one polyphenolic compound and at least one monooxazoline or monooxazine and to a process for preparing thermosetting resin products therefrom.

U.S. Pat. No. 4,430,491 discloses that thermoplastic and thermosetting polymeric compositions can be obtained from the reaction of bisoxazolines with oligomers or polymers containing more than two phenolic hydroxyl groups per molecule. These products have excellent physical properties, but the process for making them disclosed in said patent is not particularly useful in resin transfer molding (RTM) processes because the mixtures described therein possess high viscosities and they gel too rapidly in most cases to enable them to be used in the resin transfer molding process. This high viscosity and rapid gelling of the prior art materials prevents adequate flow of the mixture normally required to fill the mold properly in the resin transfer molding operation. Improved processes for preparing thermosetting and thermoplastic resins from bisoxazolines and polyphenolic compounds are also disclosed in U.S. Pat. Nos. 4,430,491; 4,613,662 and 4,699,970 and composite materials produced from bisoxazolines and polyphenolic resins are described in copending U.S. patent application Ser. No. 129,497, filed 12/07/87, all of which including the aforementioned U.S. Pat. No. 4,430,491 are incorporated herein by reference.

We have discovered that the inclusion of one or more monooxazoline or monooxazine compound into mixtures of a bisoxazoline and a polyphenolic compound produces liquid mixtures which can be advantageously used in resin transfer molding systems and that such mixtures have suitable flow times and viscosities at temperatures in the range of from about 100° C. to about 125° C. to render them useful in the resin transfer molding process. These monooxazoline and monooxazine compounds serve as reactive diluents in our invention and we have found that they do not in any way adversely affect the physical or chemical properties of the cured RTM composites.

Bisoxazolines useful in the practice of this invention include compounds having at least two oxazoline groups per molecule and particularly those described in the above cited patents which are incorporated herein by reference.

Polyphenolic compounds most useful in the practice of this invention include those compounds having more than one phenolic hydroxyl group per molecules and particularly those previously mentioned in the above references and the most preferred polyphenols are phenol-formaldehyde condensation products.

In the practice of this invention it is preferred that the ratio of bisoxazoline to polyphenolic compound used be in the range of from 20:80 to 80:20 by weight.

Monooxazolines useful in the practice of this invention include those having the following formula:

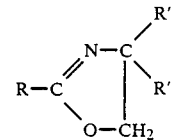

wherein R represents an aliphatic group having from 1 to 17 carbon atoms, a cycloaliphatic group having from 5 to 14 carbon atoms, an aromatic hydrocarbon group having from 6 to 14 carbon atoms, R' independently represents hydrogen, an alkyl group or substituted alkyl group or an aromatic hydrocarbon group or substituted aromatic hydrocarbon group.

Monooxazines useful in the practice of this invention include those having the following formula:

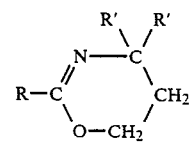

wherein R and R' have the foregoing designation.

In the practice of this invention it is preferred that one use in the resin forming mixture a ratio of from about 5% to about 25% by weight of the monooxazoline or monooxazine to the combined bisoxazoline-polyphenolic mixture.

The use of bisoxazolines for chain extension and crosslinking of polyphenolic compounds has been described in U.S. Pat. No. 4,430,491 and other patents cited above. The thermosetting resins prepared from the bisoxazoline-polyphenolic reactions have been shown to be very useful for production of high performance, fiber reinforced composites. The pure forms of the 2,2'-(1,3-phenylene)-bisoxazoline and 2,2'-(1,4-phenylene)-bisoxazoline used in various formulations, for chain extension and crosslinking reactions with the phenolic resins, are relatively high melting, crystalline compounds. The high melting bisoxazolines and phenolic resin materials cause no problem for production of composite prepregs when solution impregnation methods are employed. However, melt impregnation, resin transfer molding (RTM) techniques, etc. using 100% reactive systems, becomes very difficult, and in some cases impossible, for production of prepregs because of the high temperatures (160° C. and higher) required to give low viscosity to the blends. Even if 160° C. were an acceptable temperature, the problem of premature gellation of the resin mixture (compounded when catalysts are used) then comes into play and does not permit the maintenance of high fluidity (no gel) of the product at 100° C. during the time required to achieve melt impregnation of unidirectional fiber, fiber mats, etc. or the time to required to fill a mold cavity in a resin transfer molding process.

We have discovered a composition and process which overcomes the aforesaid difficulties arising from the use of the prior art bisoxazoline-polyphenolic mixtures particularly in resin transfer molding processes. In fact, we have found that the blending of from about 5% to about 25% by weight of a diluent monooxazoline or monooxazine of the aforementined types into the known bisoxazoline-polyphenolic mixtures provides new compositions which can advantageously be used in the resin transfer molding process. The RTM process is preferably carried out at a temperature in the range of from about 50°–125° C. for from a few minutes to an hour or more. Furthermore, the cured products resulting from the curing of the new compositions of our invention suffer no apparent loss of physical or chemical properties when compared with the cured products of the prior art.

This invention is further illustrated in the following representative examples.

EXAMPLE 1

A mixture of 6g of 2,2'-(1,3-phenylene)-bisoxazoline, (1,3-PBOX) 4g of phenol-free novolac (a phenol-formaldehyde condensation product from American Hoechst, Alnovol PN-320 having a melting range of 83°–88° C. with an acid number of less than about one), and 3g of 2-phenyloxazoline was heated and mixed at 100° C. Triphenyl phosphite (0.13 g) was added to the mixture as catalyst. The viscosity (centipoises) change of the mixture was monitored versus time. A slow increase in the viscosity was observed, see Table I. The sample of this mixture after gelation was post cured at 175° C. for 0.5 hour, then at 225° C. for 1.5 hours. The resulting cured resin was found to be transparent, hard and pale amber colored. The cured resin possessed the following properties:

| | |
|---|---|
| Glass transition temperature, Tg (°C.) by DMA* | 230 |
| Heat distortion temperature (°C.) | 188 |
| Flex strength (psi) at room temp. | 12480 |
| Flex strength (psi) at 200° F. | 11275 |
| Flex modulus ($10^3$ psi) at room temp. | 848 |
| Flex modulus ($10^3$ psi) at 200° F. | 727 |
| Compressive strength (psi) at Room temp. | 41539 |
| Compressive strength (psi) at 200° F. | 30087 |
| Compressive modulus ($10^3$ psi) at room temp. | 823 |
| Compressive modulus ($10^3$ psi) at 200° F. | 751 |
| Water absorption (24 hours at 72° F.) | 0.03 |

*DMA is Dynamic Mechanical Analysis

EXAMPLE 2

The procedure of Example 1 was repeated except that 3g of 2-ethyl oxazoline was used in place of the 2-phenyl oxazoline. The viscosity was lower than in Example 1 (see Table 1). The cured resin is found to have the following properties.

| | |
|---|---|
| Tg (°C.) by DMA, | 166 |
| Heat distortion temperature (°C.) | 182 |
| Flex strength (psi) at room temp. | 11269 |
| Flex strength (psi) at 200° F. | 9189 |
| Flex modulus ($10^3$ psi) at room temp. | 808 |
| Flex modulus ($10^3$ psi) at 200° F. | 723 |
| Compressive strength (psi) at room temp. | 37844 |
| Compressive strength (psi) at 200° F. | 31568 |
| Compressive modulus ($10^3$ psi) at room temp. | 832 |
| Compressive modulus ($10^3$ psi) at 200° F. | 725 |
| Water absorption (24 hours at 72° F.) | 0.04 |

EXAMPLE 3

The procedure of Example 1 was repeated except that only 2g of the 2-phenyl oxazoline was used. The viscosity was slightly higher than in Example 1 (see Table 1).

EXAMPLE 4

The procedure of Example 2 was repeated except that only 2 g of 2-ethyl oxazoline was used. The viscosity was slightly higher than in Example 2 (see Table 1).

EXAMPLE 5

A mixture of 91g of 2,2'-(1,3-phenylene)-bisoxazoline, 61g of the polyphenolic resin (Alnovol PN-320) described in Example 1, 46 g of 2-phenyl oxazoline and 2 g of triphenyl phosphite (catalyst) was heated at 100° C. until it became homogenous. The resulting liquid was used to hot-melt prepreg unidirectional graphite fiber (AS4–12K produced by Hercules Chemical Co.). The resin content of the prepreg was 32–36% by weight. After cooling the thus prepared prepregs were molded into a unidirectional laminate using vacuum bagging in an autoclave. The curing conditions used were 350° F. for 30 minutes, then 437° F. for 1.5 hours and 100 psi. The resin content was determined in accordance with ASTM D3171. The flexural strength and flexural modulus were measured in accordance with ASTM D790-81. The results are as follows:

| | |
|---|---|
| Resin content 32% by weight | |
| Flex strength (psi) | 220,000 |
| Flex modulus ($10^6$ psi) | 15.2 |

EXAMPLE 6

This example which is outside the scope of this invention and is presented for comparative purposes shows that when the procedure of Example 1 was repeated using the reactants shown in Table 1 that an initial viscosity (10,000 cps) which is too high to be useful per se, in prepreg technology resulted. The composition of claim 6 when cured formed a thermoset resin having a compressive strength of 35,000 psi, a glass transition temperatures of 230° C. (DMA) and a compressive modulus of 637,000 psi at room temperature. Thus the use of a monooxazoline diluent in accordance with this invention does not have any significant effect on the physical properties of the cured product.

TABLE 1

| Example | 1,3-PBOX % | Alnovol % | Ethyl Oxazoline | Phenyl Oxazoline | T = 0 | T = 30 Min. | T = 60 Min. | T = 90 Min. |
|---|---|---|---|---|---|---|---|---|
| 1 | 46 | 31 | — | 23 | 215 | 265 | 310 | 385 |
| 2 | 46 | 31 | 23 | — | 150 | 450 | 10,000 | — |
| 3 | 50 | 33 | — | 17 | 1,400 | 1,650 | 2,175 | 3,025 |
| 4 | 50 | 33 | 17 | — | 550 | 10,000 | — | — |
| 6 | 46 | 31 | — | — | 10,000+ | | | |

All sample measurements (in centipoises) were performed at 100° C. using ICI cone and plate viscometer.

We claim:

1. A polymerizable composition which is a flowable liquid at temperatures in the range of from about 100° C. to about 125° C. comprising a mixture of:
   (A) from about 75% to about 95% by weight of a mixture of:
      (1) from about 80% to about 20% by weight of a bisoxazoline and (2) from about 20% to about 80% by weight of a polyphenolic compound and (B) from about 5% to about 25% by weight of at least one member selected from the group consisting of a monooxazoline and a monooxazine.

2. The composition of claim 1 wherein the monooxazoline is one having the formula:

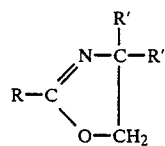

wherein R represents an aliphatic group having from 1 to 17 carbon atoms, a cycloaliphatic group having from 5 to 14 carbon atoms, an aromatic hydrocarbon group having from 6 to 14 carbon atoms, R' independently represents hydrogen, an alkyl group or substituted alkyl group having from 1 to 17 carbon atoms, an aromatic hydrocarbon group or a substituted aromatic hydrocarbon group having from 6 to 14 carbon atoms.

3. The composition of claim 1 wherein the monooxazine has the formula:

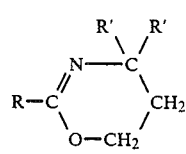

wherein R represents an aliphatic group having from 1 to 17 carbon atoms, a cycloaliphatic group having from 5 to 14 carbon atoms, an aromatic hydrocarbon group having from 6 to 14 carbon atoms, R' independently represents hydrogen, an alkyl group or substituted alkyl group having from 1 to 17 carbon atoms, an aromatic hydrocarbon group or a substituted aromatic hydrocarbon group having from 6 to 14 carbon atoms.

4. The composition of claim 1 wherein the polyphenolic compound is a phenol-formaldehyde condensation product.

5. The composition of claim 4 wherein (B) is a monooxazoline.

6. The composition of claim 4 wherein the bisoxazoline is 2,2'-(1,3-phenylene)-bisoxazoline.

7. The composition of claim 5 wherein (B) is 2-phenyloxazoline.

8. The composition of claim 5 wherein (B) is 2-ethyl oxazoline.

9. The process for producing a thermoset resin product comprising heating the composition of claim 1 at a temperature above about 160° C.

10. The thermoset product of the process of claim 9.

* * * * *